United States Patent
Bennett

(10) Patent No.: US 7,209,321 B1
(45) Date of Patent: Apr. 24, 2007

(54) DISK DRIVE PULSE WIDTH MODULATING A VOICE COIL MOTOR USING MODEL REFERENCE CURRENT FEEDBACK

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 789 days.

(21) Appl. No.: 10/633,095

(22) Filed: Jul. 31, 2003

(51) Int. Cl.
*G11B 5/596* (2006.01)

(52) U.S. Cl. ...................................................... 360/108

(58) Field of Classification Search ...................... None
See application file for complete search history.

(56) References Cited

U.S. PATENT DOCUMENTS

| | | | |
|---|---|---|---|
| 4,160,216 A | 7/1979 | Thornton | |
| 4,541,039 A | 9/1985 | Sandler | |
| 4,764,856 A | 8/1988 | Rausch | |
| 4,791,544 A | 12/1988 | Gautherin et al. | |
| 4,809,150 A | 2/1989 | Limuti et al. | |
| 4,862,054 A | 8/1989 | Schauder | |
| 4,933,829 A | 6/1990 | White | |
| 4,996,638 A | 2/1991 | Orr | |
| 5,117,347 A | 5/1992 | Rebello et al. | |
| 5,119,250 A | 6/1992 | Green et al. | |
| 5,204,593 A | 4/1993 | Ueki | |
| 5,241,251 A | 8/1993 | Wakui | |
| 5,654,840 A | 8/1997 | Patton et al. | |
| 5,663,846 A | 9/1997 | Masuoka et al. | |
| 5,757,751 A | 5/1998 | Chapman | |
| 5,760,563 A | 6/1998 | Bennett et al. | |
| 5,767,638 A | 6/1998 | Wu et al. | |
| 5,781,363 A | 7/1998 | Rowan et al. | |
| 5,838,515 A | 11/1998 | Mortazavi et al. | |
| 5,857,787 A | 1/1999 | Ryan | |
| 5,877,914 A | 3/1999 | Gontowski, Jr. | |
| 5,898,283 A | 4/1999 | Bennett | |
| 5,949,608 A | 9/1999 | Hunter | |
| 5,973,437 A | 10/1999 | Gradzki et al. | |
| 5,982,130 A | 11/1999 | Male | |
| 5,986,426 A | 11/1999 | Rowan | |
| 6,084,378 A | 7/2000 | Carobolante | |
| 6,094,020 A | 7/2000 | Goretzki et al. | |
| 6,097,564 A | 8/2000 | Hunter | |
| 6,163,430 A | 12/2000 | Hansen | |
| 6,229,663 B1 | 5/2001 | Yoneda et al. | |
| 6,373,650 B1 | 4/2002 | Pedrazzini | |
| 6,556,461 B1 | 4/2003 | Khersonsky et al. | |
| 6,639,373 B2 | 10/2003 | Knight et al. | |
| 6,711,034 B2 | 3/2004 | Duerbaum et al. | |
| 6,795,268 B1 | 9/2004 | Ryan | |
| 6,850,383 B1 | 2/2005 | Bennett | |
| 6,965,468 B2 | 11/2005 | Bennett | |

*Primary Examiner*—Hoa T. Nguyen
*Assistant Examiner*—Mark Blouin
(74) *Attorney, Agent, or Firm*—Howard H. Sheerin, Esq.

(57) ABSTRACT

A disk drive is disclosed comprising a voice coil motor (VCM) driven in a PWM mode using model reference current feedback. The PWM circuitry and VCM form a plant transfer function which varies with changes to the plant characteristics, such as the resistance of the voice coil fluctuating with temperature drift. A plant model having a model transfer function generates an estimated state of the VCM in response to a detected current flowing through the voice coil. A correction block, responsive to the detected current, adjusts PWM timing signals so that the plant transfer function substantially matches the model transfer function.

18 Claims, 5 Drawing Sheets

DISK DRIVE PULSE WIDTH MODULATING A VOICE COIL MOTOR USING MODEL REFERENCE CURRENT FEEDBACK

CROSS REFERENCE TO RELATED APPLICATIONS AND PATENTS

This application is related to U.S. Pat. No. 5,898,283 entitled "VOLTAGE FEEDFORWARD CONTROL SYSTEM FOR A SPINDLE MOTOR OF A DISK DRIVE". This application is also related to co-pending U.S. patent application Ser. No. 10/376,819 entitled "DISK DRIVE COMPRISING CURRENT SENSE CIRCUITRY FOR A VOICE COIL MOTOR" filed on Feb. 28, 2003, co-pending U.S. patent application Ser. No. 10/609,240 entitled "DISK DRIVE CONTROLLING RIPPLE CURRENT OF A VOICE COIL MOTOR WHEN DRIVEN BY A PWM DRIVER" filed on Jun. 27, 2003, and co-pending U.S. patent application Ser. No. 09/704,195 entitled "DISK DRIVE EMPLOYING SEEK TIME VCM IR VOLTAGE CALIBRATION FOR VELOCITY CONTROL OF AN ACTUATOR ARM" filed on Oct. 31, 2000. The disclosures of the above identified U.S. patent and patent applications are incorporated herein by reference.

BACKGROUND OF THE INVENTION

1. Field of the Invention

The present invention relates to disk drives for computer systems. More particularly, the present invention relates to a disk drive pulse width modulating a voice coil motor using model reference current feedback.

2. Description of the Prior Art

A disk drive typically employs a voice coil motor (VCM) comprising a voice coil which interacts with permanent magnets to rotate an actuator arm about a pivot. A head is connected to a distal end of the actuator arm to actuate it radially over the surface of a disk in order to "seek" the head to a target data track. Once the head is positioned over the target data track, the VCM servo system performs a "tracking" operation wherein the head is maintained over a centerline of the data track while writing data to or reading data from the disk.

Conventionally the VCM has been driven using an H-bridge amplifier operating in a linear mode which leads to inefficient power dissipation since the transistors are driven with constant current. Driving the H-bridge amplifier in a pulse width modulated (PWM) mode increases the efficiency by driving the transistors in a switching mode (on-off) so that power dissipation occurs only when the transistors are switched on. FIG. 1 shows a prior art transconductance amplifier configuration for driving the VCM in a PWM mode using current feedback. The VCM comprises a voice coil 2 which has an intrinsic inductance (L) and resistance (R). The voice coil 2 is driven by an H-bridge amplifier comprising driver switches 4A–4D. A sense resistor R1 is connected in series with the voice coil 2, and an amplifier 6 amplifies the voltage across the sense resistor R1 to generate a voltage 8 representing the amplitude of current flowing through the voice coil 2.

The feedback loop established through amplifier 6 turns the voltage driver into a current driver, accomplishing the change from a voltage amplifier into a transconductance amplifier (which turns a voltage command into a current output). The voltage 8 representing the actual voice coil current is subtracted at node 10 from a voltage command u(k) 12 representing a desired voice coil current. The resulting voltage at node 10 is amplified by a high gain error amplifier 14 that generates a voltage command 16 applied to a first input of comparators 18A and 18B. A signal generator 20 generates a triangle waveform 22 applied to a second input of the comparators 18A and 18B. The comparators 18A and 18B generate PWM signals 24A and 24B having a duty cycle proportional to the current command 16. The PWM signals 24A and 24B are applied to switch control 26 which controls the driver switches 4A–4D in order to control the voltage applied to the voice coil 2. Resistor R4 and capacitor C1 in the feedback path between the current command 16 and the input voltage of error amplifier 14 provide lead compensation to compensate for the lag caused by the L/R time constant of the voice coil 2.

There are several drawbacks associated with driving a VCM in a PWM mode as illustrated in FIG. 1. For example, the various analog components of the error amplifier 14 increase the complexity and cost of the VCM driver circuitry. In addition, the periodic operation of the PWM mode introduces additional lag into the transconductance loop which decreases the loop bandwidth. The lead network provided by resistor R4 and capacitor C1 helps compensate for the additional lag, but the lead network must be designed conservatively to prevent instability due to the voice coil resistance drifting as the temperature fluctuates. The PWM lag can also be reduced by increasing the frequency of the PWM signals 24A and 24B, but this reduces the efficiency advantage of operating in a PWM mode. Due to these drawbacks, the VCM has been driven in a PWM mode using the configuration of FIG. 1 only during low bandwidth portions of the seek waveform. During short seeks and tracking operations, the H-bridge amplifier has been driven in a conventional linear mode so that the bandwidth can be increased without losing stability.

There is, therefore, a need to reduce the cost and increase power efficiency of the VCM driver circuitry in a disk drive.

SUMMARY OF THE INVENTION

The present invention may be regarded as a disk drive comprising a disk, a head, and a voice coil motor (VCM) for actuating the head radially over the disk, the VCM comprising a voice coil. A plurality of driver switches control a voltage applied to the voice coil, and a pulse width modulated (PWM) signal generator generates PWM control signals applied to the driver switches. A control law block generates an acceleration command in response to a commanded current and at least one estimated state of the VCM, and a command to timing block generates a plurality of PWM timing signals in response to the acceleration command. A PWM controller generates the PWM control signals applied to the driver switches in response to the PWM timing signals, wherein the command to timing block, PWM controller, driver switches, and voice coil comprise a plant transfer function. A current detector detects a current flowing through the voice coil, and a plant model comprising a model transfer function generates the estimated state of the VCM in response to the detected current flowing through the voice coil. A correction block, responsive to the detected current, adjusts the PWM timing signals so that the plant transfer function substantially matches the model transfer function.

In one embodiment, the at least one estimated state of the VCM comprises at least one of a position, velocity, and acceleration of the VCM.

In another embodiment, the PWM timing signals comprise a PWM cycle time, a Tforward time interval of the PWM cycle time wherein a positive control voltage is applied to the voice coil, a Treverse time interval of the PWM cycle time wherein a negative control voltage is applied to the voice coil, and a Tdead time interval of the PWM cycle time wherein a substantially zero control voltage is applied to the voice coil. The correction block adjusts the Tdead time interval to control a magnitude of a ripple current flowing through the voice coil. In one embodiment, the correction block adjusts the Tdead time interval to maintain a substantially constant L/R ratio where L is an effective inductance of the voice coil and R is a resistance of the voice coil. Adjusting the Tdead time interval adjusts the effective inductance L of the voice coil 34 since the effective inductance L is a function of the actual ripple current flowing through the voice coil 34.

In yet another embodiment, the driver switches connect a supply voltage to the voice coil, and the correction block adjusts the PWM timing signals in response to the supply voltage. In one embodiment, the correction block adjusts the Tforward and Treverse time intervals in response to the supply voltage.

In another embodiment, the resistance R of the voice coil changes with temperature drift, and the correction block adjusts the Tforward and Treverse time intervals in response to a magnitude of the resistance R. In one embodiment, the correction block adjusts a saturation limit of the Tforward and Treverse time intervals in response to a magnitude of the resistance R. In still another embodiment, the correction block adjusts a saturation limit of the Tforward and Treverse time intervals in response to a magnitude of the resistance R and to a magnitude of a torque constant Kt of the VCM.

The present invention may also be regarded as a method of operating a disk drive, the disk drive comprising a disk, a head, a voice coil motor (VCM) for actuating the head radially over the disk, the VCM comprising a voice coil, and a plurality of driver switches for controlling a voltage applied to the voice coil. An acceleration command is generated in response to a commanded current and at least one estimated state of the VCM, and a plurality of PWM timing signals are generated in response to the acceleration command. PWM control signals are applied to the driver switches in response to the PWM timing signals. A current flowing through the voice coil is detected, and the estimated state of the VCM is generated in response to the detected current flowing through the voice coil. The PWM timing signals are adjusted in response to the detected current so that a plant transfer function of the VCM and driver switches substantially matches a model transfer function

DESCRIPTION OF THE PREFERRED EMBODIMENTS

Figure 1:
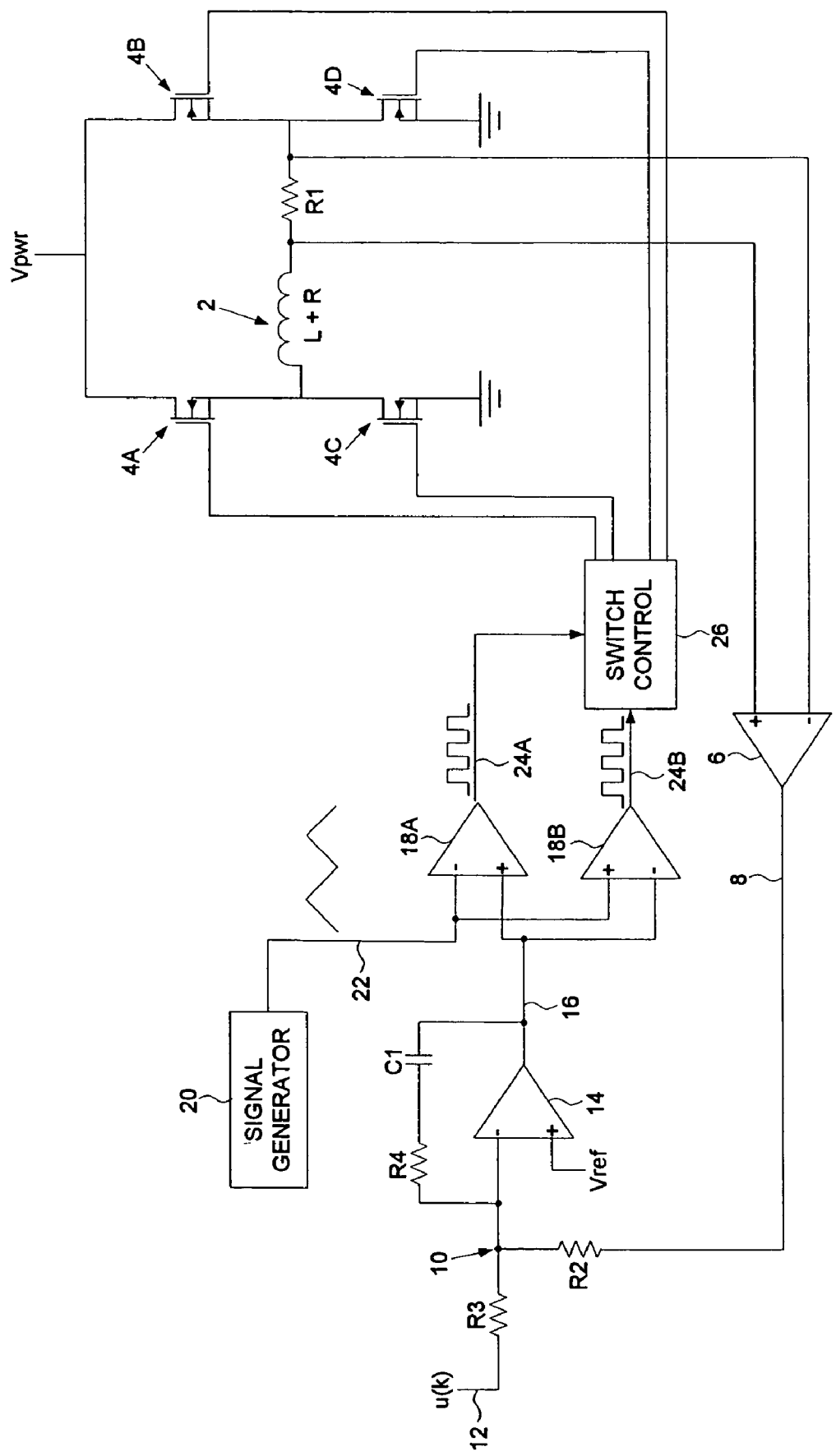
FIG. 1 shows a prior art disk drive employing a transconductance amplifier configuration for driving the VCM in a PWM mode using current feedback.
Figure 2:
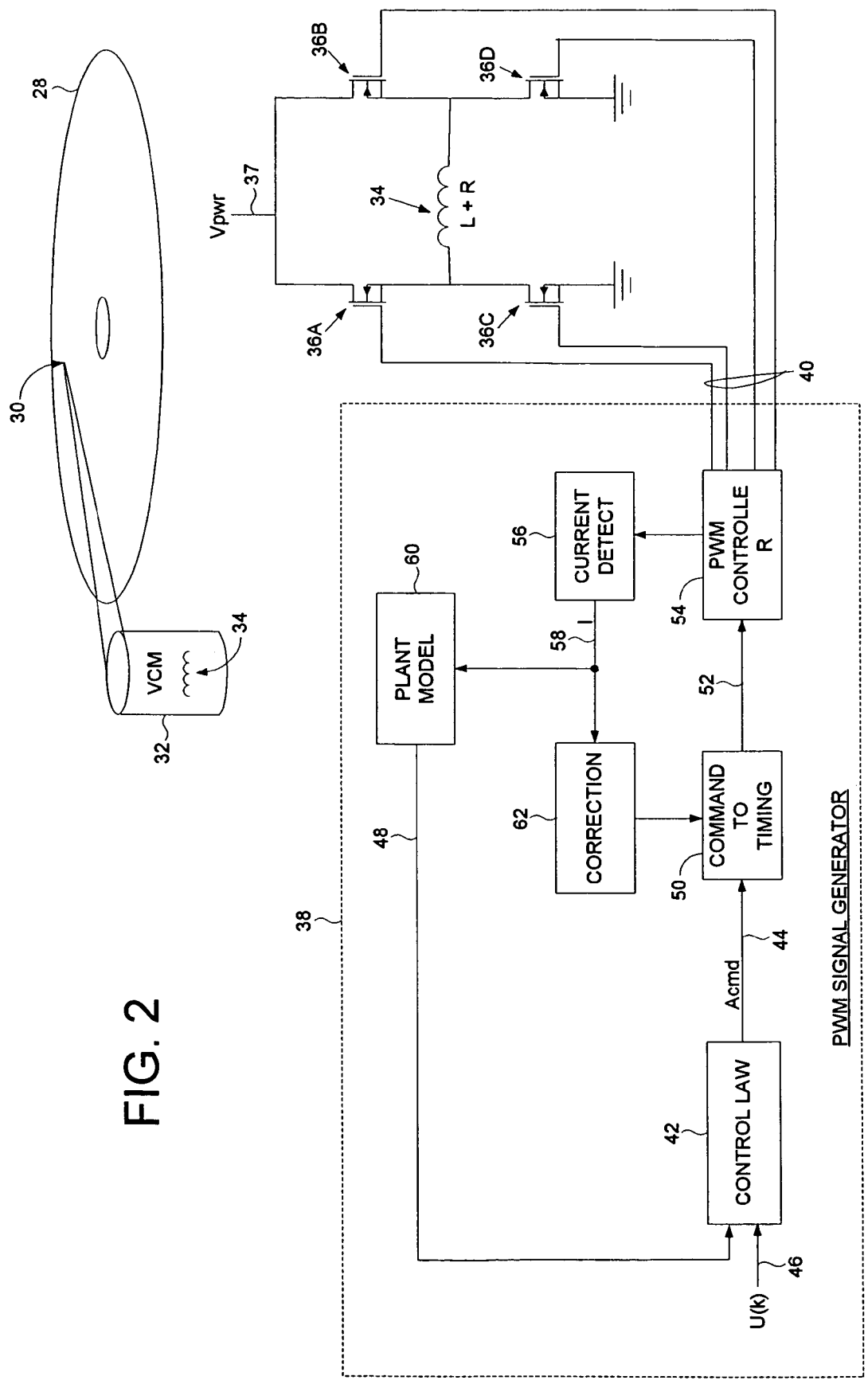
FIG. 2 shows a disk drive according to an embodiment of the present invention employing PWM signal generator comprising a PWM controller for generating PWM control signals in response to PWM timing signals, and a correction block for adjusting the PWM timing signals to adjust a transfer function of the VCM plant to match a model transfer function.

FIG. 2 shows a disk drive according to an embodiment of the present invention comprising a disk 28, a head 30, and a voice coil motor (VCM) 32 for actuating the head 30 radially over the disk 28, the VCM 32 comprising a voice coil 34. A plurality of driver switches 36A–36D control a voltage 37 applied to the voice coil 34, and a pulse width modulated (PWM) signal generator 38 generates PWM control signals 40 applied to the driver switches 36A–36D. A control law block 42 generates an acceleration command 44 in response to a commanded current 46 and at least one estimated state 48 of the VCM 32. A command to timing block 50 generates a plurality of PWM timing signals 52 in response to the acceleration command 44. A PWM controller 54 generates the PWM control signals 40 applied to the driver switches 36A–36D in response to the PWM timing signals 52. The command to timing block 50, PWM controller 54, driver switches 36A–36D, and voice coil 34 comprise a plant transfer function. A current detector 56 detects a current 58 flowing through the voice coil 34, and a plant model 60 comprising a model transfer function generates the estimated state 48 of the VCM 32 in response to the detected current 58 flowing through the voice coil 34. A correction block 62, responsive to the detected current 58, adjusts the PWM timing signals 52 so that the plant transfer function substantially matches the model transfer function.

The control law 42 of FIG. 2 implements any suitable compensation algorithm for generating the acceleration command 44 relative to the estimated state or states 48. In one embodiment, the estimated state 48 includes at least one of a position, velocity, and acceleration of the VCM 32. The plant model 60 estimates the VCM 32 response or motion when a current is applied to the voice coil 34 (as detected by the current detector 56). The estimated state 48 is a filtered representation of the actual, noisy state of the VCM 32. In state space control theory, the plant model 60 is adjusted to match the behavior of the controlled plant so as to minimize the error in the estimated state 48. However in the embodiment of FIG. 2, the plant behavior is adjusted to match the model instead. Since the plant behavior is made more constant and stable through this adjustment, fixed compensation techniques become much more effective at improving the plant behavior. The control law 42 can now also use simpler, conventional compensation techniques to compensate for the lag inherent with driving the VCM 32 in a PWM mode without having to account for variations in the plant transfer function, such as the resistance R of the voice coil 34 fluctuating with temperature. Also, the resulting performance will be more predictable compared to a conventional PWM and VCM combination.

Figure 3:
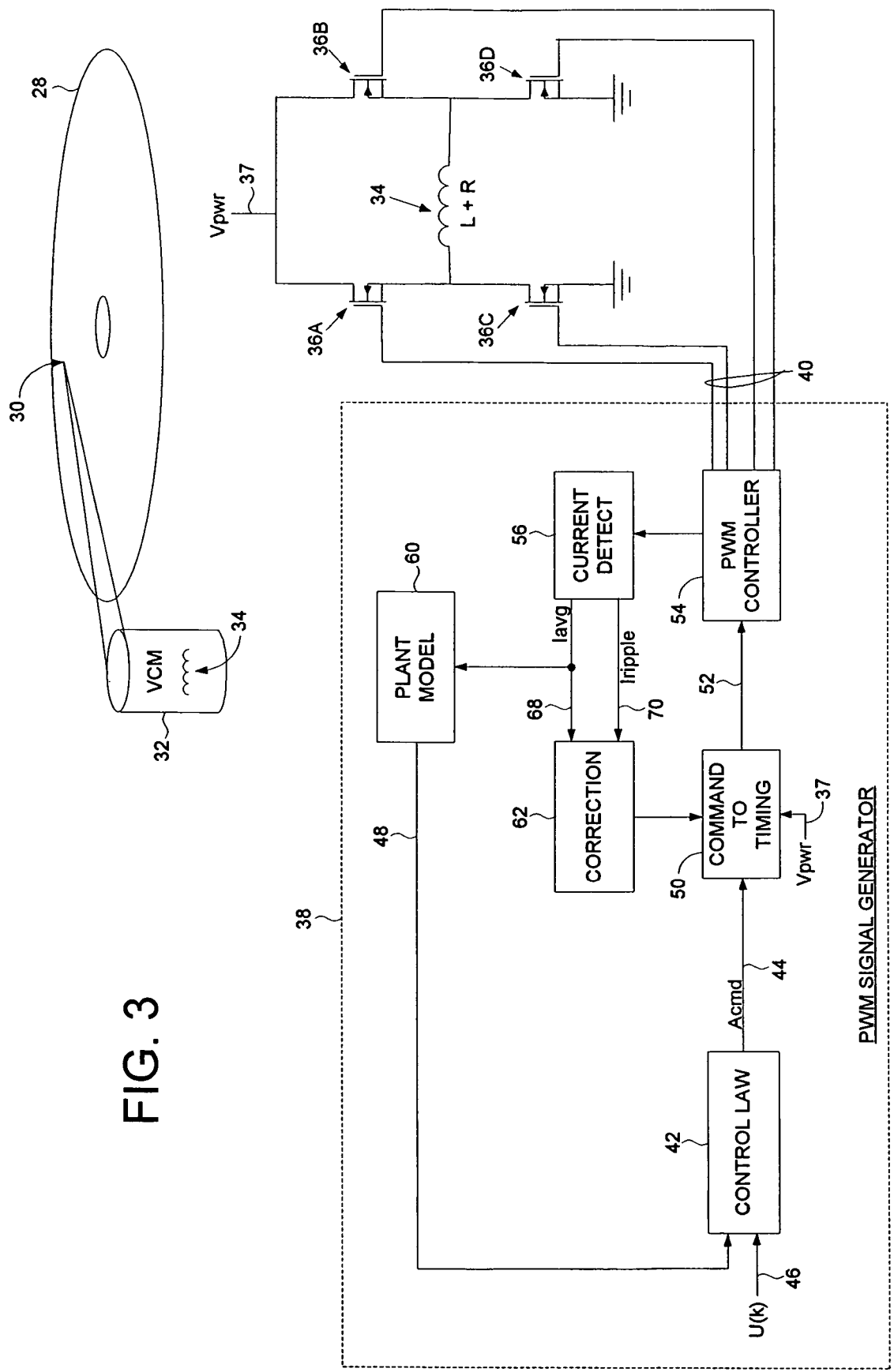
FIG. 3 shows an embodiment of the present invention wherein the correction block adjusts the PWM timing signals to control a ripple current flowing through the voice coil of the VCM.

FIG. 3 shows an embodiment of the present invention wherein the current detector 56 generates an average current Iavg 68 and a ripple current Iripple 70 flowing through the voice coil 34 over a PWM cycle time. The correction block 62 processes the average current Iavg 68 and the ripple current Iripple 70 in order to adjust the PWM timing signals 52 to maintain a substantially constant L/R ratio, wherein L is the inductance and R is the resistance of the voice coil 34.

Maintaining a substantially constant L/R ratio allows the control law 42 to compensate for the associated lag using any suitable compensation algorithm. A suitable method for generating the average current Iavg 68 over a PWM cycle time is disclosed in the above-identified co-pending patent application entitled "DISK DRIVE COMPRISING CURRENT SENSE CIRCUITRY FOR A VOICE COIL MOTOR". A suitable method for generating the ripple current Iripple 70 over a PWM cycle time and for adjusting the PWM timing signals 52 to maintain a substantially constant L/R ratio is disclosed in the above-identified co-pending patent application entitled "DISK DRIVE CONTROLLING RIPPLE CURRENT OF A VOICE COIL MOTOR WHEN DRIVEN BY A PWM DRIVER".

In the aforementioned patent application, the PWM timing signals 52 comprise a PWM cycle time, a Tforward time interval of the PWM cycle time wherein a positive control voltage is applied to the voice coil 34, a Treverse time interval of the PWM cycle time wherein a negative control voltage is applied to the voice coil 34, and a Tdead time interval of the PWM cycle time wherein a substantially zero control voltage is applied to the voice coil 34. The correction block 62 adjusts the Tdead time interval to control the magnitude of the ripple current Iripple 70 flowing through the voice coil 34. In one embodiment, the correction block 62 adjusts the Tdead time interval to maintain a substantially constant L/R ratio where L is an effective inductance of the voice coil 34 and R is a resistance of the voice coil 34. Adjusting the Tdead time interval adjusts the effective inductance L of the voice coil 34 since the effective inductance L is a function of the actual ripple current flowing through the voice coil 34.

Also in the embodiment of FIG. 3, the command to timing block 50 adjusts the PWM timing signals 52 in response to a magnitude of the supply voltage 37 driving the voice coil 34 in order to maintain a substantially constant voltage gain for the PWM controller 54. In one embodiment, the Tforward and Treverse time intervals are adjusted inversely proportional to a magnitude of the supply voltage 37. For example, the Tforward and Treverse time intervals can be adjusted directly, or the frequency for generating the intervals can be adjusted proportional to the magnitude of the supply voltage 37 while holding the PWM cycle time constant. Further details of this embodiment are disclosed in the above-identified U.S. patent entitled "VOLTAGE FEED-FORWARD CONTROL SYSTEM FOR A SPINDLE MOTOR OF A DISK DRIVE".

Figure 4:
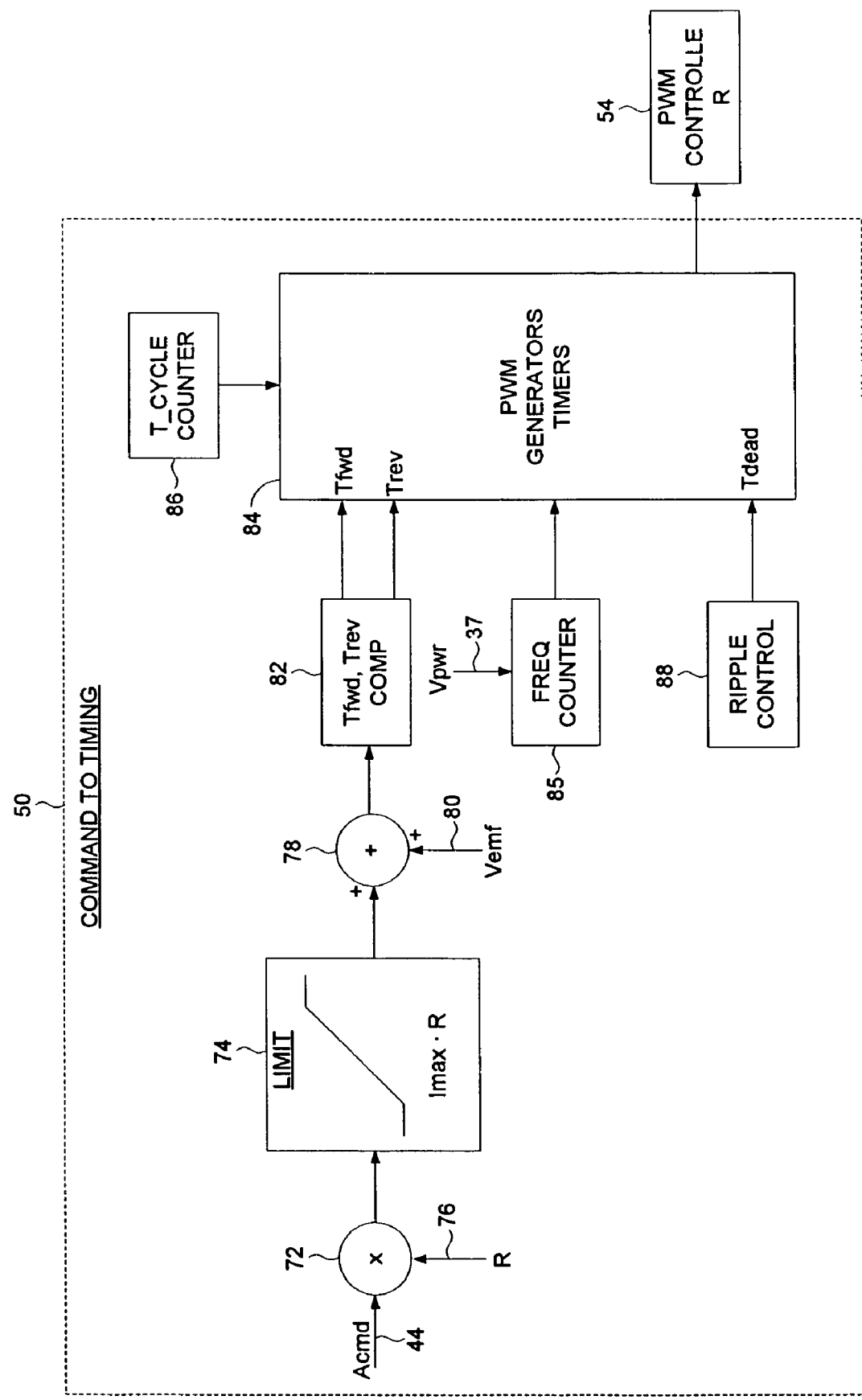
FIG. 4 shows details of a command to timing block according to an embodiment of the present invention wherein an acceleration command is scaled and limited relative to a resistance R of the voice coil.

FIG. 4 shows an embodiment of the command to timing block 50 according to an embodiment of the present invention wherein the voltage saturation characteristics of the plant transfer function are held constant by scaling 72 and limiting 74 the acceleration command 44 relative to the resistance R 76 of the voice coil 34. In conventional VCM control systems the supply voltage is typically allowed to limit the response. However, since the supply voltage varies substantially and rapidly, the supply voltage becomes a source of variation in performance, therefore the typical control system is designed with extra margin to avoid supply voltage limits. By implementing a limit that is held constant, the control system can use the entire range of actuation, including saturation, with predictable and repeatable characteristics, thereby allowing precompensation to be adjusted without regard to supply voltage amplitude. In one embodiment, the VCM coil 34 can be adjusted to compensate for the lower saturation voltage by rewinding the voice coil 34 with fewer turns, ensuring that plant maximum performance can still be achieved (and may actually increase plant performance). The resistance R 76 of the voice coil 34 may be estimated using any suitable technique, such as the technique disclosed in the above-identified co-pending patent application entitled "DISK DRIVE EMPLOYING SEEK TIME VCM IR VOLTAGE CALIBRATION FOR VELOCITY CONTROL OF AN ACTUATOR ARM".

In the embodiment of FIG. 4, the thresholds of limit 74 are computed as $\pm(Imax \cdot R)$, where Imax is a predetermined maximum current flowing through the voice coil 34. Also in the embodiment of FIG. 4, the output of the limit 74 can be adjusted (via adder 78) relative to a back EMF voltage 80 across the voice coil 34. The output of adder 78 is then used to compute 82 the Tforward and Treverse time intervals applied to a PWM generators timers block 84. The PWM generators timers block 84 is responsive to a T_CYCLE counter 86 which generates the PWM cycle time, a FREQ counter 85 adjusted in response to a magnitude of the supply voltage 37, and a ripple control block 88 for adjusting the Tdead time interval (see the above-identified co-pending patent application entitled "DISK DRIVE CONTROLLING RIPPLE CURRENT OF A VOICE COIL MOTOR WHEN DRIVEN BY A PWM DRIVER").

Figure 5:
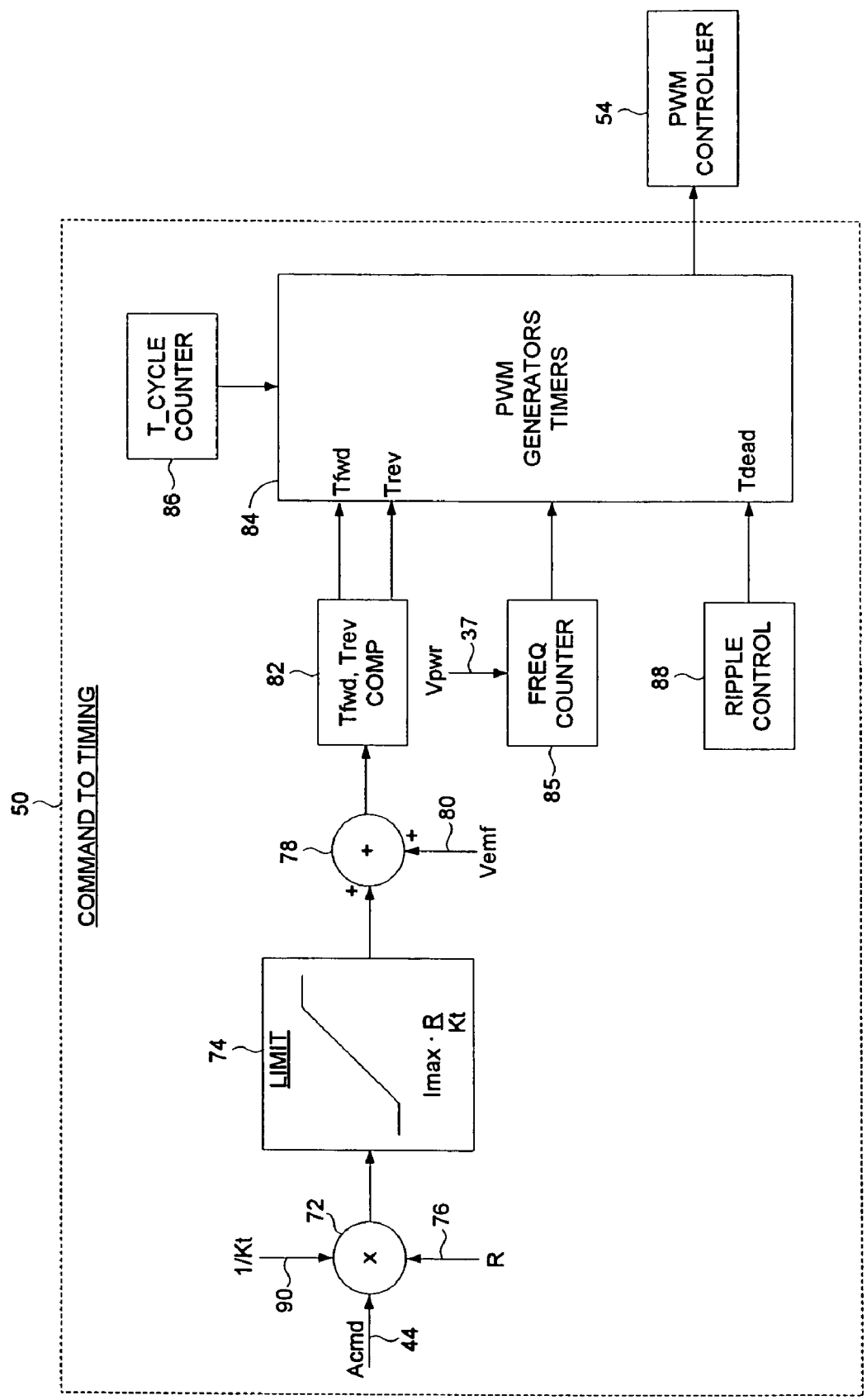
FIG. 5 shows details of a command to timing block according to an embodiment of the present invention wherein the acceleration command is further scaled and limited relative to a torque constant Kt of the VCM.

Another significant source of variation is the torque constant Kt of the VCM 32 which can vary by several percent over the travel range of the head 30. FIG. 5 shows an embodiment of the command to timing block 50 according to an embodiment of the present invention wherein the acceleration command 44 is further scaled 72 relative to a torque constant Kt 90 of the VCM 32, and the thresholds of limit 74 are computed as $\pm(Imax \cdot R/Kt)$. This accounts for changes in the torque constant Kt 90 due to voice coil magnetic structure position dependencies and temperature drift, thereby allowing the control system to be designed with the assumption that the acceleration command 44 will produce proportional motion acceleration. In one embodiment, the voice coil 34 is rewound to nominally 30% lower voltage so that the same force is generated at less than full duty cycle (70%), leaving adequate voltage headroom for thermal resistance measurements, back EMF voltages, etc.

We claim:

1. A disk drive comprising:
   (a) a disk;
   (b) a head;
   (c) a voice coil motor (VCM) for actuating the head radially over the disk, the VCM comprising a voice coil;
   (d) a plurality of driver switches for controlling a voltage applied to the voice coil;
   (e) a pulse width modulated (PWM) signal generator for generating PWM control signals applied to the driver switches, the PWM signal generator comprises:
   a control law block for generating an acceleration command in response to a commanded current and at least one estimated state of the VCM;
   a command to timing block for generating a plurality of PWM timing signals in response to the acceleration command;
   a PWM controller for generating the PWM control signals applied to the driver switches in response to the PWM timing signals, wherein the command to timing block, PWM controller, driver switches, and voice coil comprise a plant transfer function;
   a current detector for detecting a current flowing through the voice coil;

a plant model comprising a model transfer function for generating the estimated state of the VCM in response to the detected current flowing through the voice coil; and a correction block, responsive to the detected current, for adjusting the PWM timing signals so that the plant transfer function substantially matches the model transfer function.

2. The disk drive as recited in claim 1, wherein the at least one estimated state of the VCM comprises at least one of a position, velocity, and acceleration of the VCM.

3. The disk drive as recited in claim 1, wherein:
(a) the PWM timing signals comprise:
a PWM cycle time;
a Tforward time interval of the PWM cycle time wherein a positive control voltage is applied to the voice coil;
a Treverse time interval of the PWM cycle time wherein a negative control voltage is applied to the voice coil; and
a Tdead time interval of the PWM cycle time wherein a substantially zero control voltage is applied to the voice coil; and
(b) the correction block adjusts the Tdead time interval to control a magnitude of a ripple current flowing through the voice coil.

4. The disk drive as recited in claim 1, wherein:
(a) the voice coil comprises a resistance R and an effective inductance L;
(b) the effective inductance L is a function of the actual ripple current flowing through the voice coil;
(c) the resistance R changes with temperature drift; and
(d) the correction block adjusts the Tdead time interval to maintain a substantially constant L/R ratio.

5. The disk drive as recited in claim 1, wherein:
(a) the driver switches connect a supply voltage to the voice coil; and
(b) the correction block adjusts the PWM timing signals in response to the supply voltage.

6. The disk drive as recited in claim 5, wherein the correction block adjusts the Tforward and Treverse time intervals in response to the supply voltage.

7. The disk drive as recited in claim 1, wherein:
(a) the voice coil comprises a resistance R;
(b) the resistance R changes with temperature drift; and
(c) the correction block adjusts the Tforward and Treverse time intervals in response to a magnitude of the resistance R.

8. The disk drive as recited in claim 7, wherein the correction block adjusts a saturation limit of the Tforward and Treverse time intervals in response to a magnitude of the resistance R.

9. The disk drive as recited in claim 7, wherein:
(a) the VCM comprises a torque constant Kt; and
(b) the correction block adjusts a saturation limit of the Tforward and Treverse time intervals in response to a magnitude of the resistance R and to a magnitude of the torque constant Kt.

10. A method of operating a disk drive, the disk drive comprising a disk, a head, a voice coil motor (VCM) for actuating the head radially over the disk, the VCM comprising a voice coil, and a plurality of driver switches for controlling a voltage applied to the voice coil, the method comprising the steps of:
(a) generating an acceleration command in response to a commanded current and at least one estimated state of the VCM;

(b) generating a plurality of PWM timing signals in response to the acceleration command;
(c) generating PWM control signals applied to the driver switches in response to the PWM timing signals;
(d) detecting a current flowing through the voice coil;
(e) generating the estimated state of the VCM in response to the detected current flowing through the voice coil; and
(f) adjusting the PWM timing signals in response to the detected current so that a plant transfer function of the VCM and driver switches substantially matches a model transfer function.

11. The method as recited in claim 10, wherein the at least one estimated state of the VCM comprises at least one of a position, velocity, and acceleration of the VCM.

12. The method as recited in claim 10, wherein:
(a) the PWM timing signals comprise:
a PWM cycle time;
a Tforward time interval of the PWM cycle time wherein a positive control voltage is applied to the voice coil;
a Treverse time interval of the PWM cycle time wherein a negative control voltage is applied to the voice coil; and
a Tdead time interval of the PWM cycle time wherein a substantially zero control voltage is applied to the voice coil; and
(b) further comprising the step of adjusting the Tdead time interval to control a magnitude of a ripple current flowing through the voice coil.

13. The method as recited in claim 10, wherein:
(a) the voice coil comprises a resistance R and an effective inductance L;
(b) the effective inductance L is a function of the actual ripple current flowing through the voice coil;
(c) the resistance R changes with temperature drift; and
(d) further comprising the step of adjusting the Tdead time interval to maintain a substantially constant L/R ratio.

14. The method as recited in claim 10, wherein:
(a) the driver switches connect a supply voltage to the voice coil; and
(b) further comprising the step of adjusting the PWM timing signals in response to the supply voltage.

15. The method as recited in claim 14, further comprising the step of adjusting the Tforward and Treverse time intervals in response to the supply voltage.

16. The method as recited in claim 10, wherein:
(a) the voice coil comprises a resistance R;
(b) the resistance R changes with temperature drift; and
(c) further comprising the step of adjusting the Tforward and Treverse time intervals in response to a magnitude of the resistance R.

17. The method as recited in claim 16, further comprising the step of adjusting a saturation limit of the Tforward and Treverse time intervals in response to a magnitude of the resistance R.

18. The method as recited in claim 16, wherein:
(a) the VCM comprises a torque constant Kt; and
(b) further comprising the step of adjusting a saturation limit of the Tforward and Treverse time intervals in response to a magnitude of the resistance R and to a magnitude of the torque constant Kt.

* * * * *